United States Patent [19]

Zardi et al.

[11] Patent Number: 5,184,386
[45] Date of Patent: Feb. 9, 1993

[54] METHOD FOR RETROFITTING CARBON MONOXIDE CONVERSION REACTORS

[75] Inventors: Umberto Zardi, Via Lucino 57, CH-6932 Breganzona; Giorgio Pagani, Lugano, both of Switzerland

[73] Assignees: Ammonia Casale S.A.; Umberto Zardi, Switzerland

[21] Appl. No.: 676,455

[22] Filed: Mar. 26, 1991

Related U.S. Application Data

[63] Continuation of Ser. No. 447,719, Dec. 8, 1989, abandoned.

[30] Foreign Application Priority Data

Dec. 9, 1988 [CH] Switzerland .................. 04550/88

[51] Int. Cl.$^5$ .......................... B21K 21/16; A01C 1/00
[52] U.S. Cl. ................................. 29/401.1; 422/148; 423/361
[58] Field of Search ............... 29/401.1; 422/148, 194, 422/191, 193, 203; 423/360, 361

[56] References Cited

U.S. PATENT DOCUMENTS 4,755,362 7/1988 Zardi .................................. 422/148

Primary Examiner—Timothy V. Eley
Attorney, Agent, or Firm—Ostrolenk, Faber, Gerb & Soffen

[57] ABSTRACT

Reactors for the catalytic conversion of carbon monoxide into carbon dioxide are advantageously modified in situ from axial flow reactors into substantially radial flow reactors, and more particularly into axial-radial flow reactors. To this end at least an external cylindrical wall perforated for its whole length and an internal wall preferably perforated for most of its length are inserted inside the conventional reactor shell and cartridge.

8 Claims, 4 Drawing Sheets

METHOD FOR RETROFITTING CARBON MONOXIDE CONVERSION REACTORS

This is a continuation of application Ser. No. 07/447,719, filed on Dec. 8, 1989 now abandoned.

BACKGROUND OF THE INVENTION

1. Field of the Invention

This invention concerns a system for increasing the conversion of carbon monoxide into carbon dioxide and more particularly in reactions $H2O + CO = CO2 + H2$, used for example to prepare gas for the synthesis of ammonia and carried out in reactors with at least one bed formed by large size catalyst pellets compatible with the pressure drop resulting from the axial flow of the reaction gas.

The invention comprises also reactors so obtained by modifying them in situ.

2. Description of the Related Art

One of the fundamental operations in preparing synthesis gas for NH3 (N2+H2 mixture) is the conversion of CO into CO2 and H2 according to the following chemical reaction:

$$H2O + CO \rightleftharpoons CO2 + H2$$

This reaction, in modern ammonia production lines, takes place in two stages at a pressure of about $30 \div 40$ kg/cm2, namely:

1st stage at high temperature in which the gas is reacted on an iron oxide catalyst at a temperature of $350 \div 400°$ C. and in which the CO is converted from $17 \div 20\%$ mole on a dry basis to a residual 3%, still on a dry basis;

2nd stage at low temperature, at about $200 \div 250°$ C. and using a copper-based catalyst. During this second stage, given the lower temperature, the balance is directed towards the conversion of the carbon monoxide and it is possible to obtain very low CO residue ($\approx 0.3\%$ mole on a dry basis) thus facilitating the depuration treatment which follows (elimination of CO2 by washing with suitable solvents, and elimination of residual CO by methanation or by washing with liquid nitrogen).

Conversion reactions take place in large axial-flow converters, with adiabatic operation (therefore increasing the temperature as a result of the exothermic reaction), usually not with full board and with a noticeable pressure drop, given the axial flow and the large amounts of gas involved.

The catalysts most widely used at present are in tablets with a medium or small granulometry. Small granulometry catalysts (for example $6.4 \times 3.2$ mm) are more active than medium granulometry catalysts (for example $9.5 \times 4.7$ mm).

Their use, however, is made difficult by the fact that in axial flow catalytic beds they involve a higher pressure drop.

A purpose of this invention is to provide a system which makes it possible to eliminate the foregoing troubles and to obtain a greater conversion of CO into CO2 in conventional reactors.

Another purpose of the invention is to obtain reactors allowing a greater conversion of CO into CO2 by modifying in situ conventional reactors.

SUMMARY OF THE INVENTION

These and other aims are achieved with the system according to the invention, characterized by the fact that the axial flow of reaction gas is changed to substantially radial flow in situ thus reducing pressure drop and using a smaller size catalyst.

In a particularly simple and advantageous embodiment, in an existing reactor are inserted two cylindrical walls substantially perforated along their height, providing the annular delimitation of the catalytic bed. Preferably one of the two walls has an unperforated portion and the gas flow is axial-radial.

It should be underlined that a system for the modification in situ of reactors for ammonia or methanol synthesis is described in U.S. Pat. No. 4,755,362 by the Applicants. It was not at all obvious, however, that a system for the modification in situ could be advantageously applied to reactors for converting CO into CO2 as well.

Finally, in U.S. Pat. No. 4,372,920 by the Applicants there is a description of axial-radial reactors ex-novo, i.e. not obtained by modifying in situ pre-existing reactors.

BRIEF DESCRIPTION OF THE DRAWINGS

The various aspects and advantages of the invention will be better illustrated by the following description of some preferred but not limitative embodiments shown in the attached drawings which are a schematic and partial view with a plan containing the reactor's major longitudinal axis.

DETAILED DESCRIPTION OF THE PREFERRED EMBODIMENTS

M indicates the pressure-resisting shell of said pre-existing axial flow reactor, such shell remaining unaltered in the invention. In the same way (see, for a comparison, FIG. 2), inlets U1 (for example for CO) and U2 (for example for steam) are left unaltered, as well as the reacted gas outlet GR through the bottom opening 14.

Figure 1:
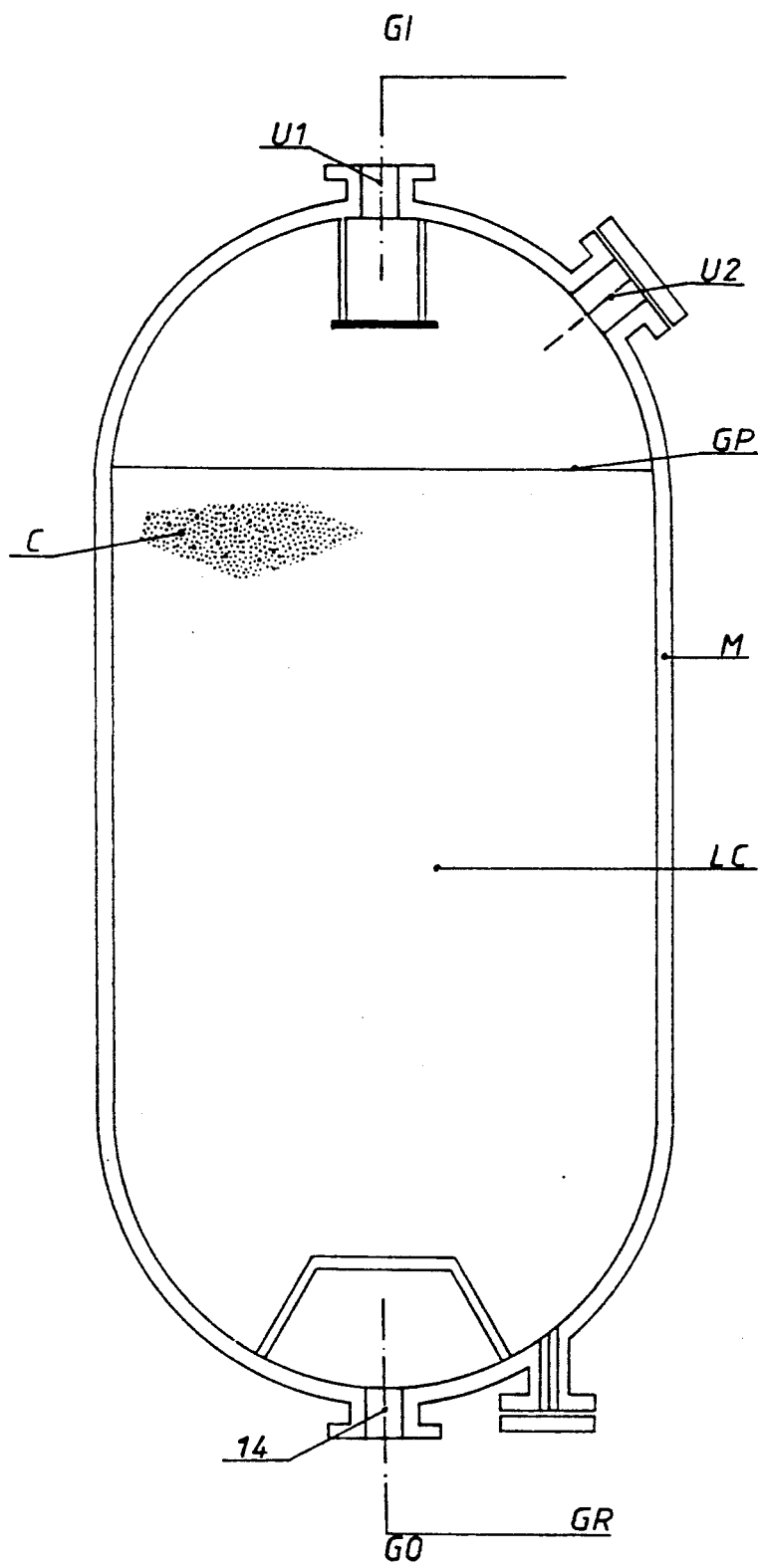
FIG. 1 shows a conventional reactor.

In FIG. 1 the catalytic bed LC consists of a full and continuous mass of catalyst C in direct contact with the internal wall of shell M. At the top the bed has a free surface GP which gas U1 and gas U2 with axial flow will meet with a considerable pressure drop.

According to the invention, the above-mentioned existing axial reactor is modified in situ by introducing inside it (by way, for example, of the manhole) a collector or a perforated cylindrical external wall Pe and a collector or a cylindrical internal wall Pi which preferably has a single unperforated longitudinal portion ZNF with height "h". The external wall Pe is perforated all along its longitudinal length H. In the embodiment shown in FIG. 2 the internal wall Pi is shaped like an inverted tube TU; the incoming gas now runs through the upper zone ZNF with height "h" with an axial flow and through the major zone with height "H" with a radial flow.

Figure 2:
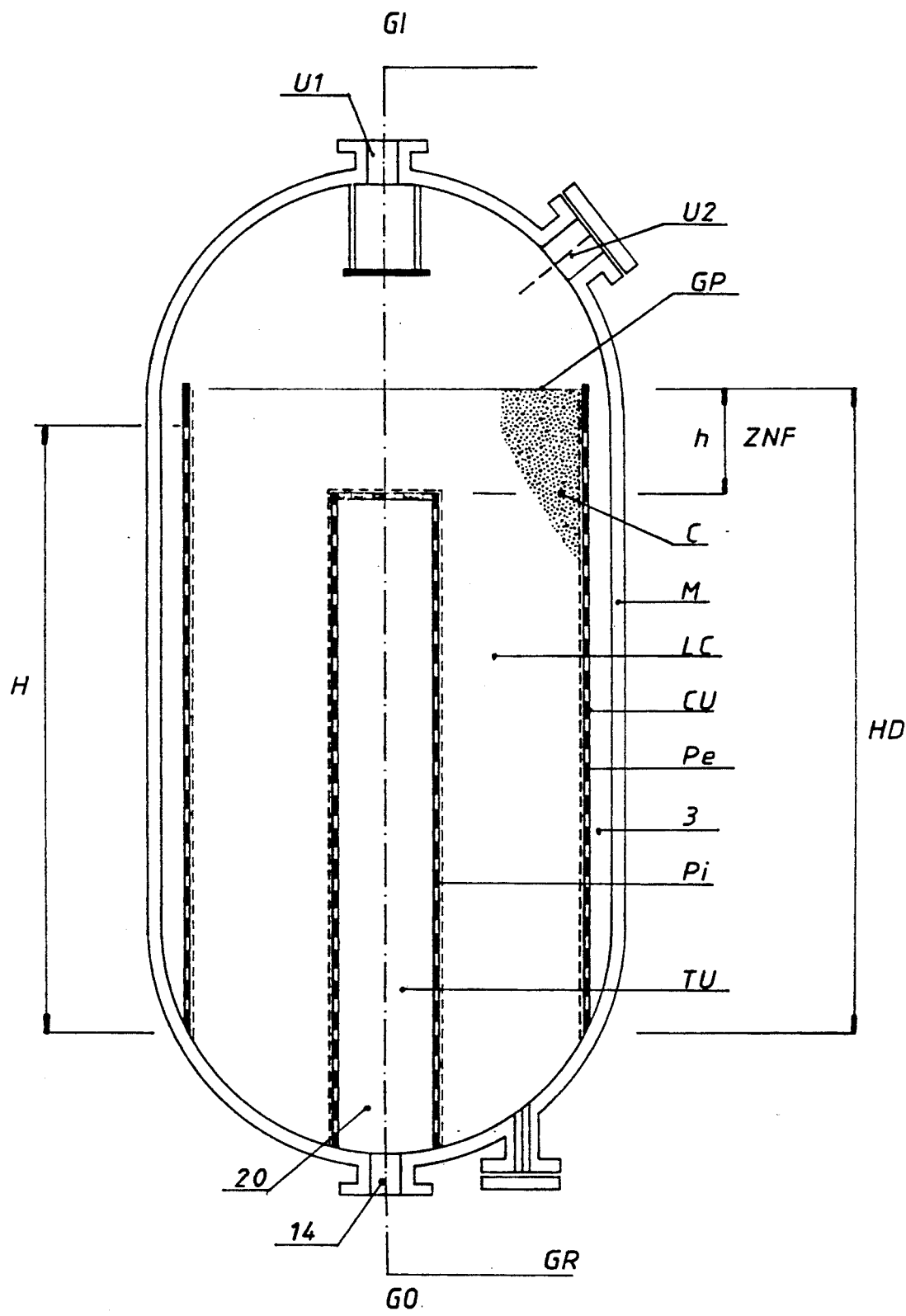
FIG. 2 shows a reactor in accordance with the invention.
Figure 3:
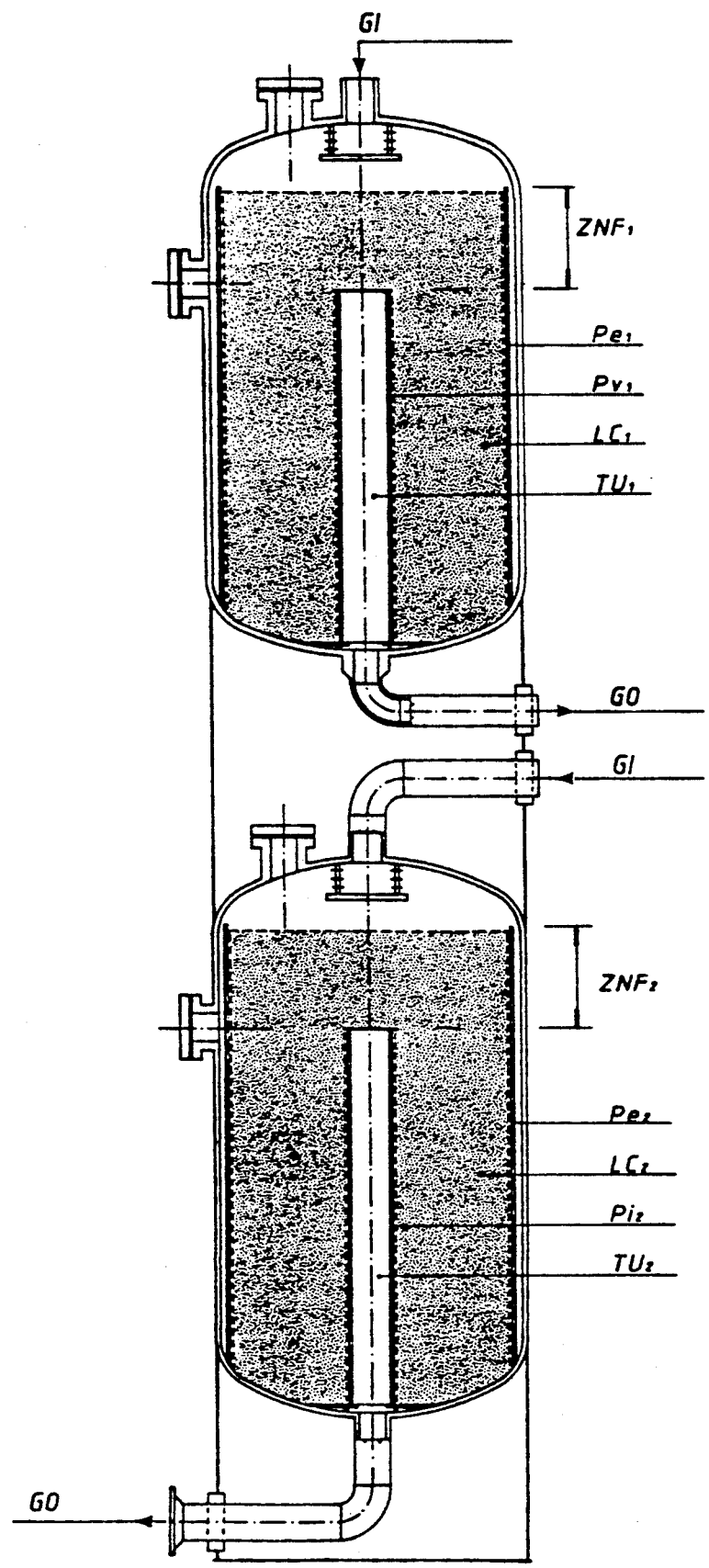
FIG. 3 shows the reactor of the invention, including two catalytic beds.

FIG. 3 shows a reactor with two catalytic beds LC1 and LC2 modified in situ the same as the single bed in FIG. 2. The equipment in FIG. 3, therefore, functions like two separate reactors.

Figure 4:
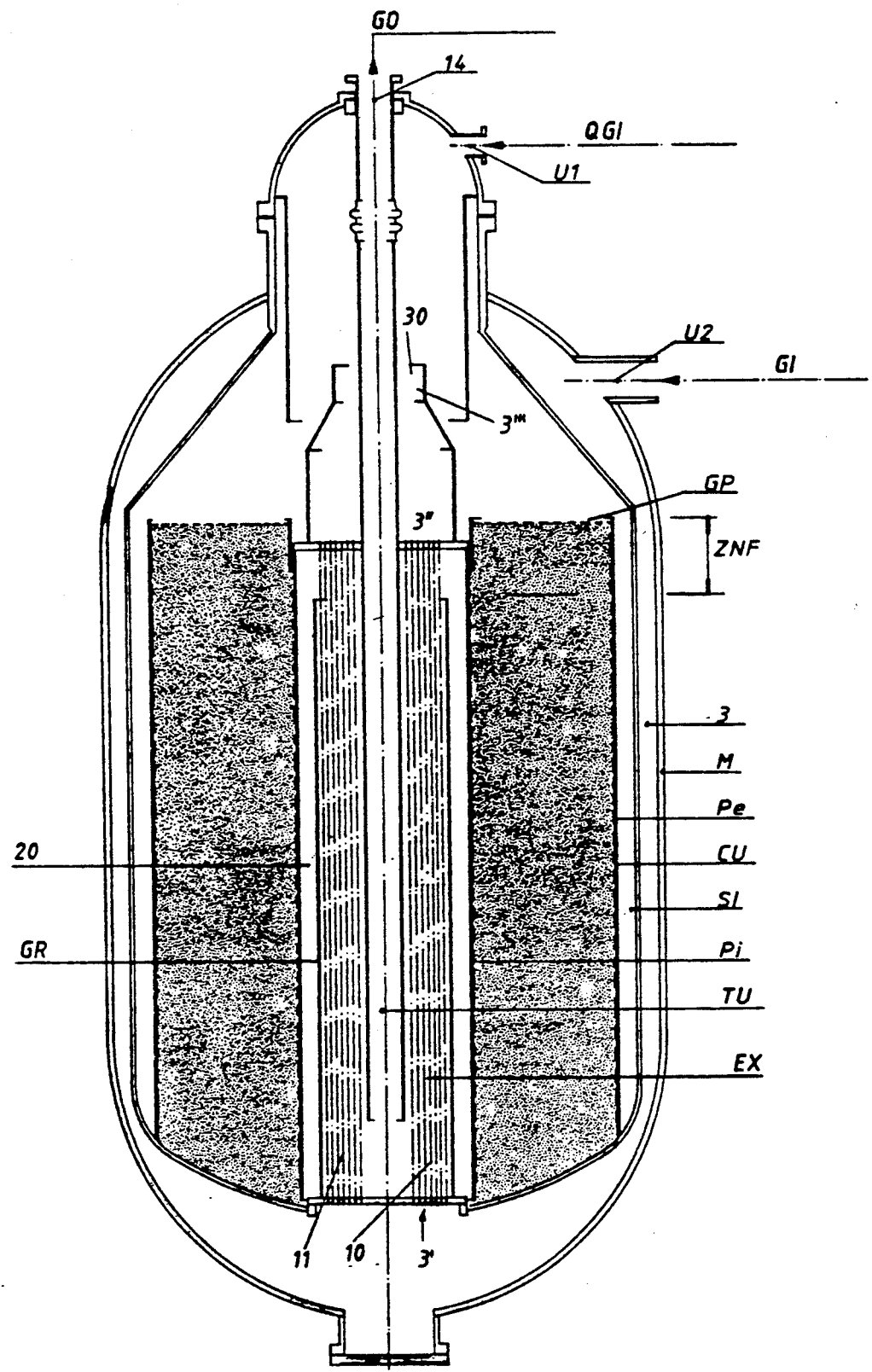
FIG. 4 shows the reactor of the invention including a heat exchanger.

FIG. 4 shows another particular embodiment comprising the central tube TU and a tube heat exchanger EX inside Pi.

To make it easier to understand the invention in FIG. 2 showing possible heat exchangers which can be arranged inside Pi has been deliberately omitted.

In FIG. 4 the fresh reaction gas coming in from U1 and U2 runs from top to bottom along airspace 3 between the shell M and cartridge CU (thus keeping cool the internal face of M), flows upward again (3') inside tubes 10, 11, etc. of EX (being pre-heated by reacted gas GR circulating outside tubes 10 and 11), leaves (3") from EX and (3''') from outlets 30 and flows downwards again through the catalytic bed LC, flowing axially along the unperforated smaller portion ZNF and radially all along zone H-h where H is the height of perforated external wall Pe.

The reacted gas GR collects in the airspace 20 between Pi and EX, and from its bottom flows upwards (as already mentioned) impinging on the outside of tubes 10 and 11 to leave from 14. Because of the substantially radial flow catalyst C can now have a small granulometry.

Equally advantageous types of embodiment have been tried, with or without EX, with Pi totally perforated and Pe substantially perforated, with catalytic bed LC having a smaller solid portion in contact with TU etc., more particularly according to the various embodiments described in U.S. Pat. Nos. 4,372,920 and No. 4,755,362, so that the embodiment shown even though preferred must be understood to be above all illustrative and non-limitative.

Preferably external collector Pe and internal collector Pi are in several parts (for example 8 pieces) each of a size capable of passing through the manhole; the pieces are assembled (welded) inside shell M and cartridge CU. Preferably the parts forming a collector consist of a net and of a bridge-perforated plate, as described in previous patents by the Applicants.

Although the present invention has been described in connection with a preferred embodiment thereof, many other modifications and variations will now become apparent to those skilled in the art without departing from the scope of the invention. It is preferred, therefore, that the present invention not be limited by the specific disclosure herein, but only by the appended claims.

We claim:

1. A method for retrofitting a pre-existing axial flow carbon monoxide conversion reactor with internals to the convert the reactor to a substantially radial or axial-radial flow reactor, the reactor comprising a pressure-resisting shell containing a catalyst bed comprising tablets for catalyzing conversion of carbon monoxide to carbon dioxide, the method comprising the steps of:

(a) inserting a first perforated, cylindrical wall into the reactor and positioning the first perforated, cylindrical wall within the reactor at a position near the shell to form a perforated, cylindrical, external wall for the catalyst bed, the external wall having a diameter smaller than that of the shell;

(b) inserting a second perforated, cylindrical wall into the reactor and positioning the second perforated, cylindrical wall within the reactor to form a perforated, cylindrical internal wall for the catalyst bed, the internal wall having a smaller diameter than that of the external wall, the external wall, the internal wall and a portion of the pressure-resisting shell defining a space for containing the catalyst bed; and (c) containing the carbon monoxide conversion catalyst tablets in the catalyst bed-containing space.

2. The method of claim 1, further comprising the step of inserting an upper unperforated portion of the first perforated, cylindrical wall into the reactor for causing radial flow through the catalyst bed.

3. The method of claim 1, further comprising the step of positioning the first perforated, cylindrical wall in contact with the pressure-resisting shell and positioning the second perforated, cylindrical wall in contact with the pressure-resisting shell to define an open top portion of the catalyst-containing space.

4. The method of claim 1, further comprising the steps of inserting a cartridge wall for containing the external and internal walls and the catalyst bed into the reactor and positioning the cartridge wall within the reactor between the external wall and the shell.

5. The method of claim 4, further comprising the step of positioning the first perforated, cylindrical wall in contact with the pressure-resisting shell and positioning the second perforated, cylindrical wall in contact with the pressure-resisting shell to form the catalyst-containing space with an open top portion.

6. The method of claim 4, further comprising the step of inserting a heat exchanger for exchanging heat between carbon monoxide feed gas and reacted gas from the catalyst bed into the reactor.

7. The method of claim 1, wherein step c) comprises containing medium sized, carbon monoxide conversion tablets in a the catalyst bed-containing space, each tablet being 9.5×4.7 mm.

8. The method of claim 1, wherein step c) comprises containing small sized carbon monoxide conversion tablets in the catalyst bed-containing space, each tablet being 6.4×3.2 mm.

* * * * *